United States Patent
Forman et al.

(10) Patent No.: US 7,305,145 B2
(45) Date of Patent: Dec. 4, 2007

(54) METHOD AND APPARATUS FOR FILTERING AN IMAGE

(75) Inventors: Arthur V. Forman, Orlando, FL (US);
Anthony Krivanek, Orlando, FL (US);
Dat T. Nguyen, Orlando, FL (US);
Scott P. LaPointe, Orlando, FL (US);
Michael J. Mayercik, Tucson, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 629 days.

(21) Appl. No.: 10/444,125

(22) Filed: May 23, 2003

(65) Prior Publication Data

US 2004/0234157 A1   Nov. 25, 2004

(51) Int. Cl.
*G06K 9/36*   (2006.01)
*H04N 5/225*   (2006.01)
*G01B 11/14*   (2006.01)

(52) U.S. Cl. .................. 382/291; 348/169; 356/614

(58) Field of Classification Search ............... 382/291, 382/260; 356/614; 348/169
See application file for complete search history.

(56) References Cited

U.S. PATENT DOCUMENTS

| | | | | |
|---|---|---|---|---|
| 5,982,912 A | * | 11/1999 | Fukui et al. | 382/118 |
| 6,823,086 B1 | * | 11/2004 | Dolazza | 382/261 |
| 2002/0001398 A1 | * | 1/2002 | Shimano et al. | 382/104 |
| 2003/0152271 A1 | * | 8/2003 | Tsujino et al. | 382/190 |

FOREIGN PATENT DOCUMENTS

JP   2001319221 A   * 11/2001

OTHER PUBLICATIONS

M Palaniswami, T Q Nguyen and R Oxbrow, An Efficient Filter Structure for Edge Detection, 1988, IECON '88, p. 60-63.*

* cited by examiner

*Primary Examiner*—Samir Ahmed
*Assistant Examiner*—Randolph Chu
(74) *Attorney, Agent, or Firm*—Buchanan Ingersoll & Rooney PC

(57) ABSTRACT

Objects are detected in an image using a spatially variant filter. The size of the filter is adjusted based on the portion of the image being processed by the filter. Portions of the image which are closer to an imaging device which captured the image are processed using a larger sized filter. Portions of the image which are further from the imaging device are processed using a smaller sized filter.

3 Claims, 6 Drawing Sheets

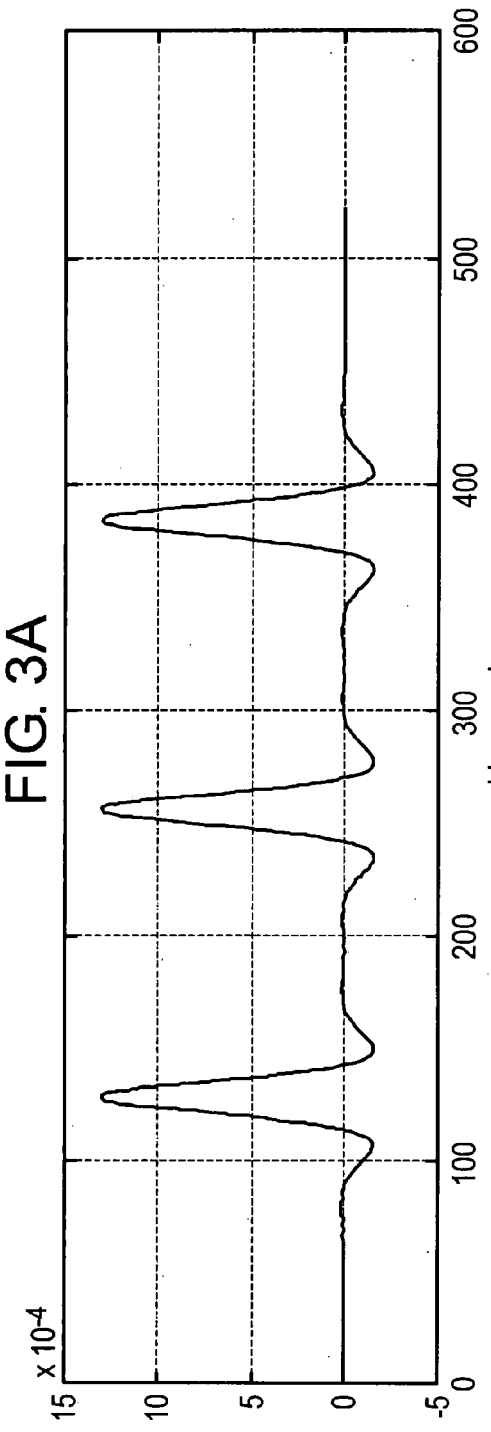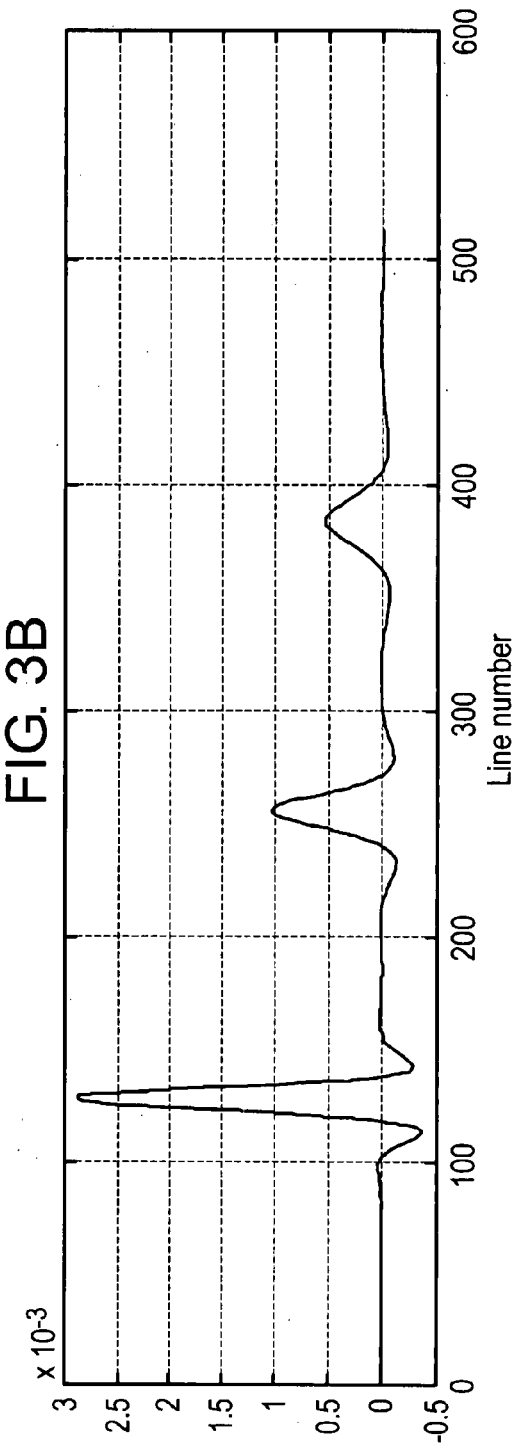

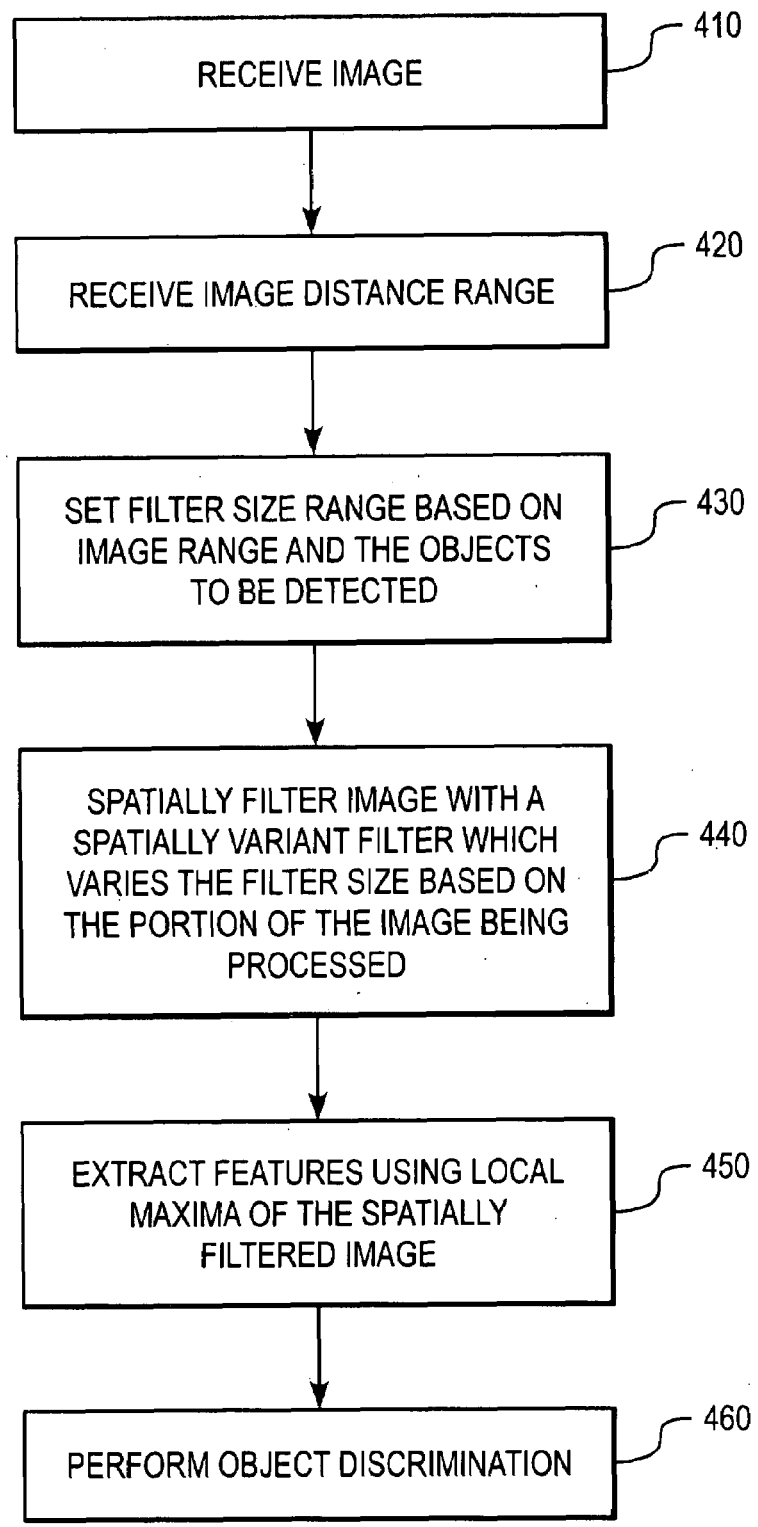

METHOD AND APPARATUS FOR FILTERING AN IMAGE

BACKGROUND

1. Field of Invention

The present invention relates to processing of image data. More particularly, the present invention relates to a method and apparatus for spatially filtering an image, wherein the filter size is adjusted based on which portion of the image is being processed.

2. Background Information

Historically, reconnaissance information has provided important information used in planning military operations. For example, prior to the advent of photography, scouts would be sent out to collect information regarding natural resources such as lakes and rivers, enemy troop information and the like. With the advent of photography, these scouts would provide reconnaissance information by capturing a scene of enemy installations, battlefields, and the like, using photographs. As technology advances, new methods are provided for collecting reconnaissance information. For example, it is quite common today to have reconnaissance planes, manned or remotely controlled, or satellites capture a scene for reconnaissance purposes. In addition to conventional photographic techniques, a scene can be captured using infrared detectors and the like.

Typically scenes captured by reconnaissance techniques have been analyzed by humans in order to determine the content of the captured scene. For example, a human would analyze a photograph to determine the location of bodies of water, the location of enemy troops and the location of man-made objects such as buildings and lines of communication. The human who analyzed the photograph would then have to relay the determined information to people in the field, for example, to an airplane pilot in order to identify targets. However, using humans to analyze photographs is very labor intensive. Further, there can be a considerable delay between the time when a scene is captured and the time in which the information in the captured scene is relayed to persons in the field.

Moreover, a person who receives a captured scene may not have the time to analyze it. For example, in a single seat aircraft scenes captured by sensors on the aircraft can be provided directly to the pilot. However, in addition to analyzing a scene, the pilot also has to fly the aircraft.

Accordingly, it would be desirable to automate the analysis of images. Further, it would be desirable to provide mechanisms for determining whether the automated analysis is producing accurate results.

SUMMARY OF THE INVENTION

In accordance with one embodiment of the present invention, a method and apparatus for detecting objects in an image are provided. The image is processed using a filter to produce a filtered image. The size of the filter varies in dependence upon a portion of the image being processed. The filtered image is employed for detecting objects.

In accordance with another aspect of the present invention, a method and apparatus are provided for detecting objects in an image. An image and a distance range are received. A filter size is set based on the image range and objects to be detected. The image is spatially filtered with a spatially variant filter which varies the filter size based on a portion of the image being processed. Features are extracted from the image using local maxima of the spatially filtered image. Objects are detected based on the extracted features.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein:

FIG. 3A illustrates the response of a conventional difference of Gaussian filter.

FIG. 3B illustrates the response of the difference of Gaussian filter in accordance with exemplary embodiments of the present invention.

FIG. 4 illustrates an exemplary method for spatially filtering an image in accordance with the present invention.

DETAILED DESCRIPTION

Figure 1:
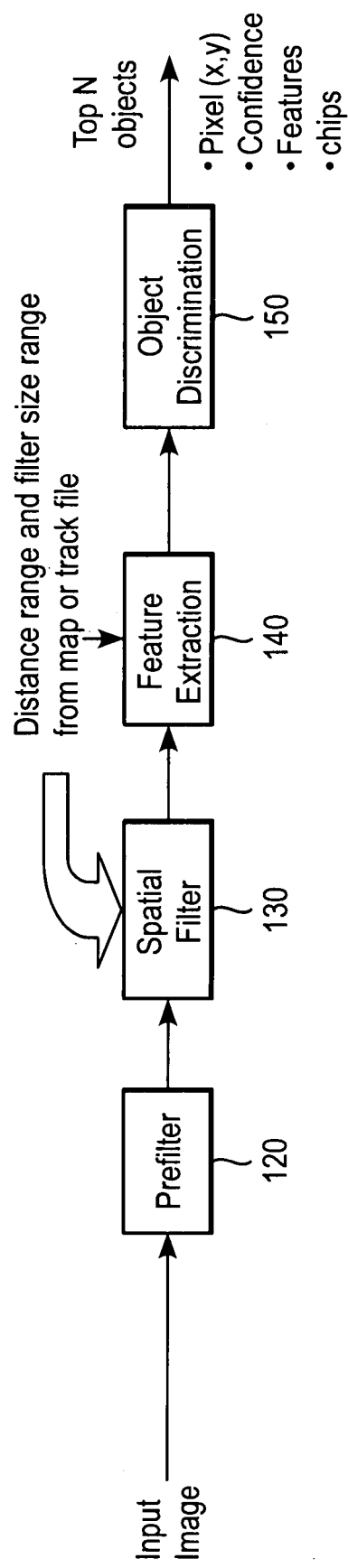
FIG. 1 is a block diagram of an exemplary automatic target detection system which employs the spatial filter of the present invention.

FIG. 1 is a block diagram of an exemplary automatic target detection system in which the present invention can be implemented. An input image is received by the system and is provided to prefilter 120. Prefilter 120 produces a gradient magnitude image by employing a Sobel or Gabor operator. The operation and use of a Sobel or Gabor operator for image processing is well known in the art, and hence, a detailed description of such is omitted. The gradient magnitude image output by prefilter processing block 120 is provided to spatial filter 130.

In accordance with exemplary embodiments of the present invention, spatial filter 130 performs a difference of Gaussians filtering of the gradient magnitude image. Specifically, the spatial filter receives an input of the range of distances from the imaging device which captured the image to the top of the image and the bottom of the image, and a corresponding filter size range. As will be described in more detail below, the size of the spatial filter employed by the present invention is varied based upon the distance between the imaging device which captured the image and a particular point in the image. The distance range can be based upon measurements by a sensor associated with the imaging device using radar or laser. Alternatively, the distance range can be based on a flat earth assumption. The distance range and filter size range can be provided by a map or from a track file associated with the imaging device. The spatially filtered image output from processing block 130 is provided to feature extraction block 140 for extracting various features from the image. As illustrated in FIG. 1, the feature extraction block also receives the distance range and filter size ranges to assist in the feature extraction. The feature extracted image is provided to object discrimination processing block 150 for detecting objects in the image. Object detection generally involves discriminating between objects of interest and clutter in an image. Object discrimination processing block 150 outputs the top N objects detected in the image, as well as the objects pixel coordinates, a confidence value, features and chips. An image chip is a rectangular window centered around an object location which is large enough to encompass the object. Features are numerical values extracted from a chip, the higher the value the more likely the chip contains an object.

Figure 2:
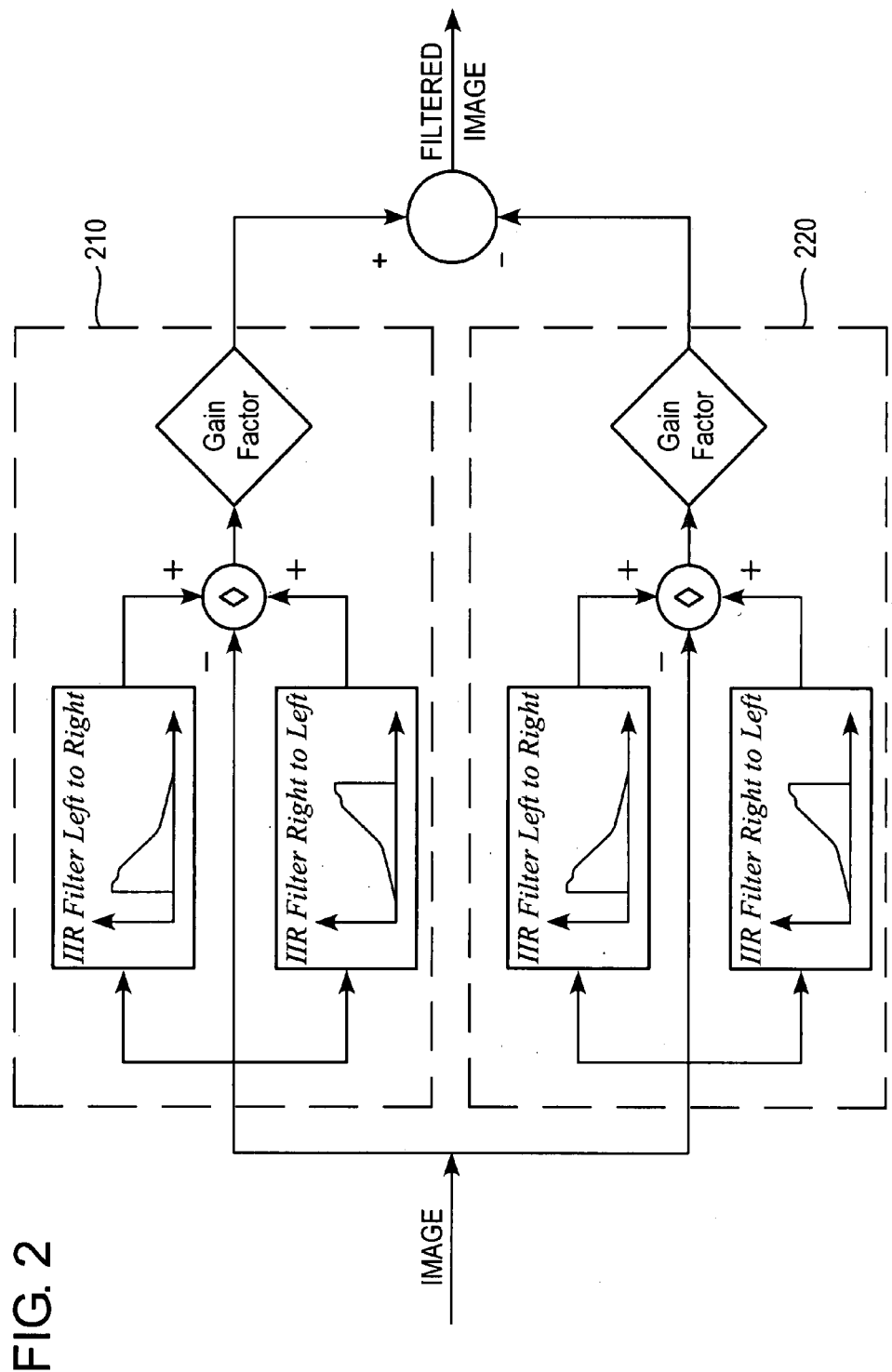
FIG. 2 illustrates an exemplary difference of Gaussian's filter in accordance with exemplary embodiments of the present invention.

FIG. 2 illustrates an exemplary spatial filter in accordance with exemplary embodiments of the present invention. Specifically, FIG. 2 illustrates an exemplary difference of Gaussians filter which is approximated using the infinite impulse response filters. Accordingly, the image received from pre-filter processing block 120 is provided to both the upper Gaussian filter 210 and the lower Gaussian filter 220. The output of the lower Gaussian filter is subtracted from the output of the upper Gaussian filter to provide the filtered image for feature extraction block 140. It will be recognized that the response of the Gaussian filters is provided by the following formula:

$$y(n)=x(n)+a_1x(n-1)+b_1y(n-1)+b_2y(n-2); \quad (1)$$

where:

$$a_1 = \exp\left(\frac{\alpha^2}{2}\right) - b_1; \quad (2)$$

$$b_1 = 2e^\alpha \cos(\omega); \quad (3)$$

$$b_2 = -e^{2\alpha}; \quad (4)$$

$$\alpha = \frac{1}{\sigma}; \quad (5)$$

$$\omega = 0.8\alpha; \quad (6)$$

and where y is the filtered output, x is the input, and n represents pixel address.

The size of a Gaussian filter can be set by using a from equation 5. When performing a difference of Gaussians calculation there will be a fixed ratio between the size of the outer Gaussian filter and the inner Gaussian filter. The fixed ratio is typically between 1.4 and 2. Accordingly, once the a value is set for either the outer or the inner Gaussian filter, the size of the inner or outer Gaussian filter can be respectively set.

Since the conventional Gaussian filter employs a static value a for the filter size, the same size will be employed when spatially filtering the entire image. However, images typically have objects which are farther away from the imaging device in the upper portions of the image, while the lower portions of the image contain objects which are closer to the imaging device. Accordingly, the present invention accounts for the different sizes of objects in an image depending upon the position of the object in the image by making the σ value, i.e., the size of the filter, vary depending upon which portion of the image is being processed by the filter. Specifically, in accordance with exemplary embodiments of the present invention, equation 5 above is replaced with equation 7 as follows:

$$\alpha = \frac{1}{\sigma(m)} \quad (7)$$

Accordingly, the size of the filter of the present invention will vary depending upon the particular line number m being processed by the Gaussian filter. When the Gaussian filter operates on portions of the image which are closer to the top of the image, the filter will have a smaller size, and when the filter is operating on the lower portions of the image the filter will have a larger size.

FIGS. 3A and 3B respectively illustrate the response of a conventional difference of Gaussian filter and the response of the difference of Gaussian filter in accordance with exemplary embodiments of the present invention. In FIGS. 3A and 3B the vertical axis represents the frequency response of the difference of Gaussian filter, while the horizontal axis represents the line number of the image, wherein line number zero is at the top of the image and line number 600 is at the bottom of the image. As illustrated in FIG. 3A, using the conventional difference of Gaussian filter, in which the same size filter is applied across the entire image, the impulse response of the filter will have the same width regardless of which particular portion of the image is being processed by the filter. In contrast, as illustrated in FIG. 3B, the difference of Gaussian's filter of the present invention, by adjusting the size of the filter depending upon the particular portion of the image being processed, provides a wider impulse response the closer that the particular portion being processed by the filter is towards the bottom of the image. The feature extraction processing block 140 will extract features based upon the local maxima of the impulse response. Accordingly, the image data surrounding each of the three peaks illustrated in FIG. 3B will be extracted by feature extraction processing block 140.

Figure 5:
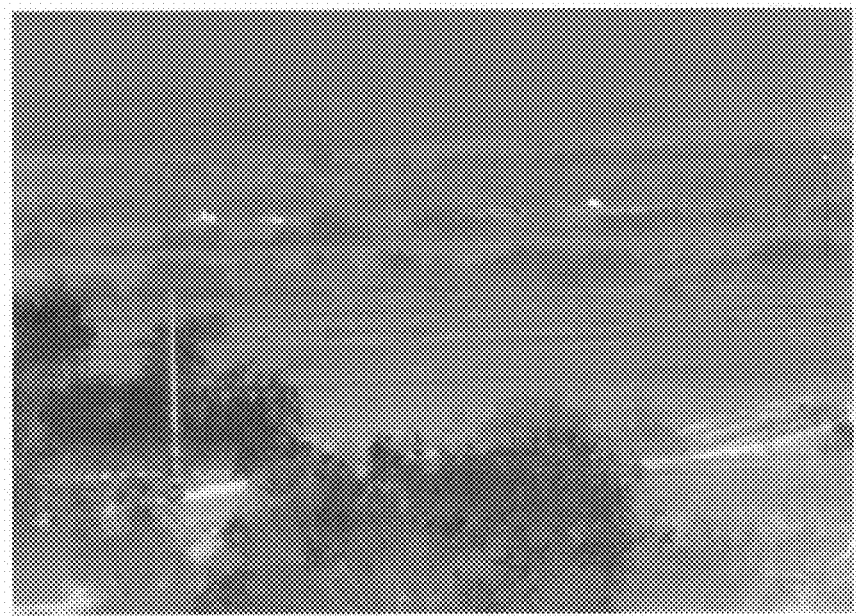
FIG. 5 illustrates an exemplary image upon which spatial filtering can be performed in accordance with exemplary embodiments of the present invention.

FIG. 4 illustrates an exemplary method in accordance with the present invention. The method of FIG. 4 will be described in connection with the images of FIGS. 5-7. Initially, an image is received, such as the image illustrated in FIG. 5 (step 410). Next image range information is received (step 420). Image range information can be obtained from the imaging device or from an associated tracking file. Moreover, if the image rows are not parallel to the horizon, known techniques can be employed to rotate the image such that the captured scene is perpendicular to the imaging device. The filter size range is set based upon the image distance range and the objects to be detected (step 430). In accordance with exemplary embodiments of the present invention, the filter size range is used to adjust the σ value of the Gaussian filter.

Figure 6:
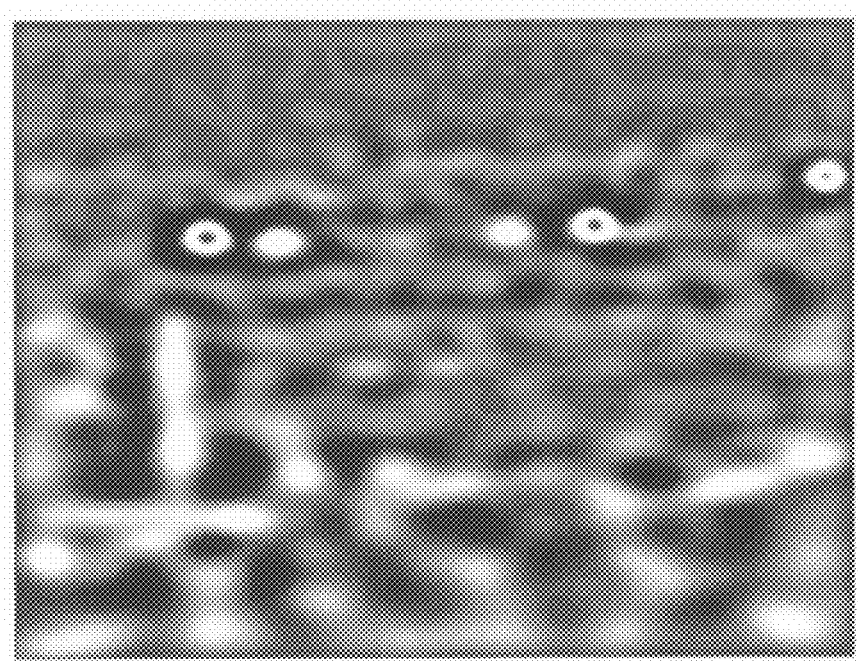
FIG. 6 illustrates the image of FIG. 5 after spatial filtering in accordance with exemplary embodiments of the present invention.
Figure 7:
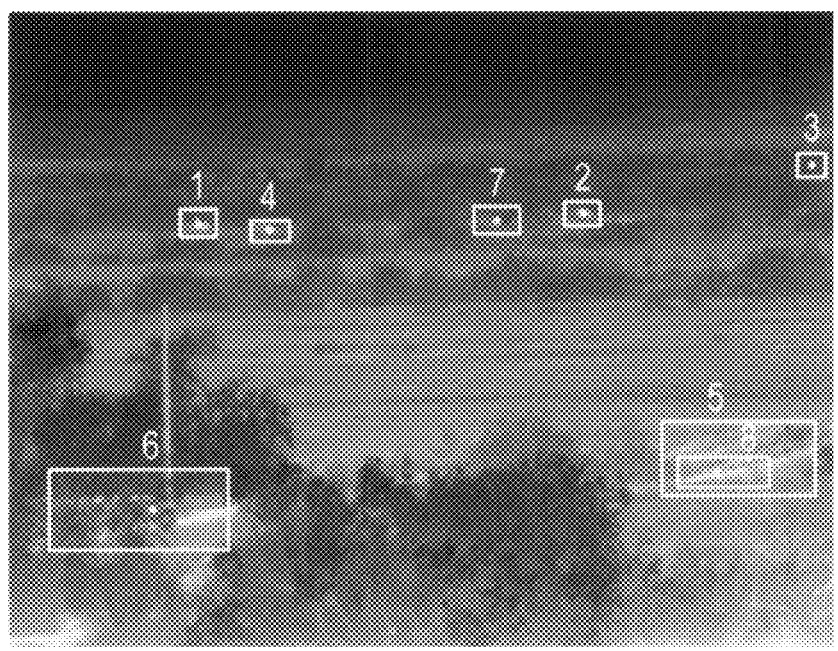
FIG. 7 illustrates the detection of objects in the image of FIG. 5 in accordance with exemplary embodiments of the present invention.

The received image is spatially filtered with a filter whose size varies based upon the portion of the image being processed (step 440). FIG. 6 illustrates a spatially filtered version of the image of FIG. 5 filtered in accordance with exemplary embodiments of the present invention. The spatially filtered image is used to extract features by employing local maxima (step 450). After feature extraction, object discrimination (step 460) is performed to output an image with detected objects in the image, as well as an associated confidence value. FIG. 7 illustrates such an image wherein the numbers in the image correspond to the different objects detected in the image. As can be seen from FIG. 7, objects lower in the image are surrounded by larger rectangles because of the larger size filter used to detect them compared to objects higher in the image.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for detecting objects in an image comprising:
   receiving an image;
   processing the image using a filter to produce a filtered image, a size of the filter varying in dependence upon a position in the image of a portion of the image being processed; and
   detecting objects in the filtered image,
   wherein the filter is an infinite impulse response difference of Gaussians filter,
   wherein the size of the filter varies in dependence upon a line number of the portion of the image being processed, and
   wherein the size of the filter increases as the filter moves from a line number at a top position of the image to a line number at a bottom position of the image.

2. An apparatus comprising:
   an input which receives an image;
   a filter which filters the image, a size of the filter varying in dependence upon a position in the image of a portion of the image being processed; and
   an output which outputs the filtered image,
   wherein the filter is an infinite impulse response difference of Gaussians filter,
   wherein the size of the filter varies in dependence upon a line number of the image being processed, and
   wherein the size of the filter increases as the filter moves from a line number at a top position of the image to a line number at a bottom position of the image.

3. A method of detecting objects in an image comprising;
   receiving an image;
   receiving a distance range of distances to the image from an imaging device which captured the image;
   setting a filter size range based on the distance range and objects to be detected in the image;
   spatially filtering the image with a spatially variant filter which varies filter size based on a position in the image of a portion of the image being processed;
   extracting features from the image using local maxima of the spatially filtered image; and
   detecting objects in the image using the extracted features.

* * * * *